United States Patent [19]

Hoffa et al.

[11] Patent Number: 4,489,321
[45] Date of Patent: Dec. 18, 1984

[54] RADAR GROUND SPEED SENSING SYSTEM

[75] Inventors: Robert J. Hoffa; Carl M. Burde, both of Waterloo, Iowa

[73] Assignee: Deere & Company, Moline, Ill.

[21] Appl. No.: 491,696

[22] Filed: May 5, 1983

[51] Int. Cl.³ .............................................. G01S 13/60
[52] U.S. Cl. ................................... 343/8; 343/7 VM
[58] Field of Search ................................. 343/7 VM, 8

[56] References Cited

U.S. PATENT DOCUMENTS

| | | | |
|---|---|---|---|
| 3,833,906 | 9/1974 | Augustine | 343/9 |
| 3,859,660 | 1/1975 | Augustine et al. | 343/9 |
| 4,110,754 | 8/1978 | Endo | 343/7 VM |
| 4,225,950 | 9/1980 | Kotera et al. | 343/7 VM |
| 4,308,536 | 12/1981 | Sims, Jr. et al. | 343/7 VM |
| 4,354,191 | 10/1982 | Matsumura et al. | 343/7.5 |
| 4,359,734 | 11/1982 | Bachman | 343/8 |

OTHER PUBLICATIONS

Egawa, "A Microwave Doppler Radar Velocity Meter for Construction Machinery", 1982, SAE Technical Paper No. 821083.
Richardson et al., "True Ground Speed Measurement Techniques", 1982, SAE Technical Paper No. 821058.
Tsuha et al., "Radar True Ground Speed Sensor for Ag. & Off-Road Equipment", 1982, SAE Technical Paper No. 821059.

*Primary Examiner*—Maynard R. Wilbur
*Assistant Examiner*—Gilberto Barron, Jr.

[57] ABSTRACT

A Doppler radar speed sensing system includes a microwave transceiver and a circuit for generating an input pulse train having pulsewidths related to the ground speed of a vehicle carrying the system. A signal processor includes a microprocessor which executes a signal processing algorithm which converts the input pulse train to an output pulse train having desired characteristics. For example, the output pulse train has output pulses with pulsewidths and frequency related to the vehicle ground speed. The output signal pulse train responds rapidly to changes in sensed ground speed, but is insensitive to Doppler signal dropout.

11 Claims, 7 Drawing Figures

4,489,321

RADAR GROUND SPEED SENSING SYSTEM

BACKGROUND OF THE INVENTION

The present invention relates to a Doppler radar speed sensing system.

It is well known that the speed of a moving object, such as a vehicle, can be measured by means of a Doppler radar system. For example, microwave Doppler radar systems have been used on vehicles to measure their ground speed. A conventional technique in such systems is to utilize a phase-lock-loop, PLL, as part of the signal processing circuitry. Such a PLL generates a signal with a frequency which is approximately the average of the frequency of an incoming Doppler signal. However, such radar systems with PLLs respond slowly to changes in vehicle speed and produce errors in accuracy. For example, the quality of information contained in the PLL generated signal may be degraded by momentary Doppler signal loss due to the composition and condition of the terrain over which the vehicle is traveling. Degradation may also be caused by the random nature of the Doppler signal and by the presence of some moving objects in the field of view of the antenna.

SUMMARY OF THE INVENTION

An object of the present invention is to provide a Doppler radar speed sensing system with a fast response time.

Another object of the present invention is to provide such a radar system with increased accuracy and reduced sensitivity to terrain variations and to moving objects in the field of view of the antenna.

These and other objects are achieved by the present invention which processes a vehicle speed dependent Doppler signal from a conventional microwave Doppler speed sensing radar. The input Doppler signal is converted to an input squarewave pulse train by a Schmitt trigger. A microprocessor receives the input pulse train and calculates output values as a function of the input signal pulsewidths according to a signal processing algorithm. The algorithm ignores pulsewidths longer than a threshold pulsewidth to reduce inaccuracies which would otherwise be caused by Doppler signal dropout. The algorithm calculates an output value by one of two different methods, depending upon whether the input signal pulsewidth is within or outside of a certain range. One method permits the output value to respond more rapidly to a changed trend in the speed of the vehicle. The algorithm also operates to toggle an output of the microprocessor to generate an output signal pulse train having output pulses with pulsewidths and frequency determined by the calculated output values, and therefore related to vehicle speed. The velocity information contained in this output signal pulse train may be displayed by the use of such devices as a conventional frequency-to-voltage converter or frequency counter and conventional analog or digital displays.

DETAILED DESCRIPTION

Figure 1:
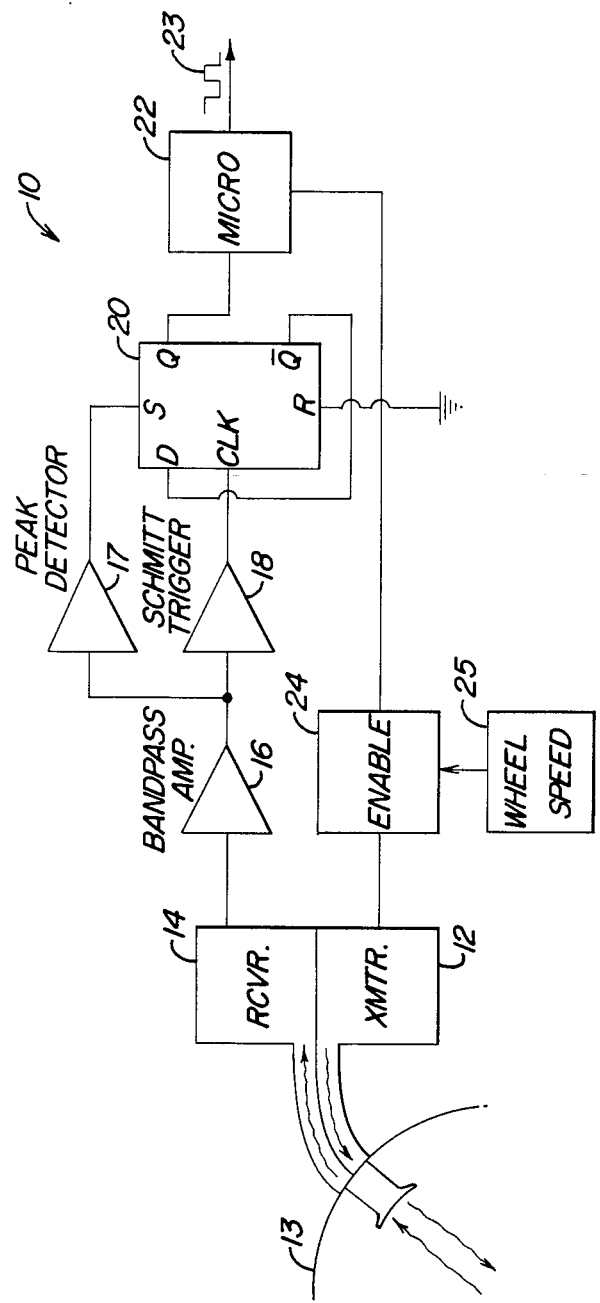
FIG. 1 is a simplified block diagram of the present invention.
Figure 2A:
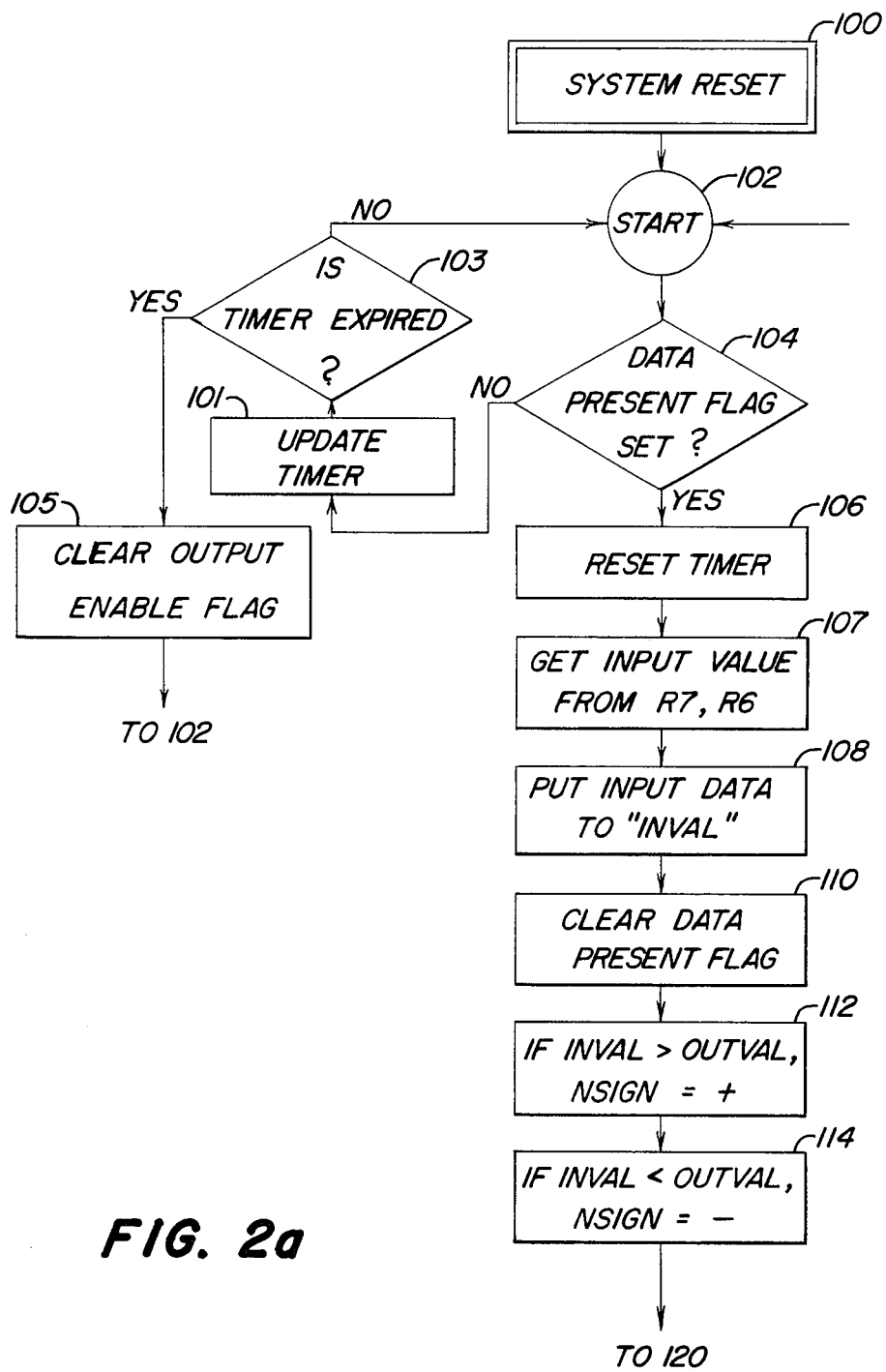
FIGS. 2a–2d are logic flow diagrams representing the signal processing algorithm performed by the present invention.
Figure 2B:
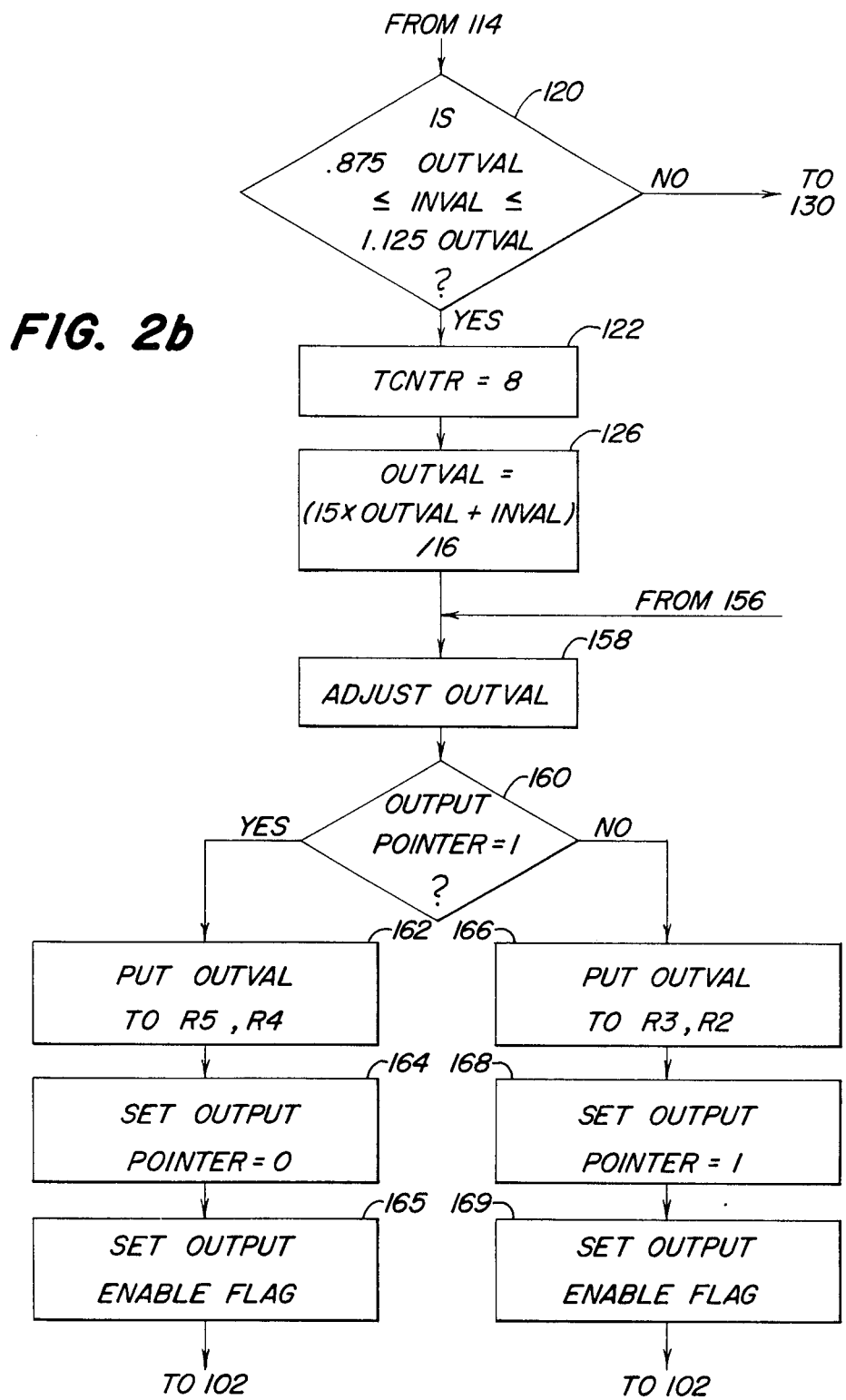
Figure 2C:
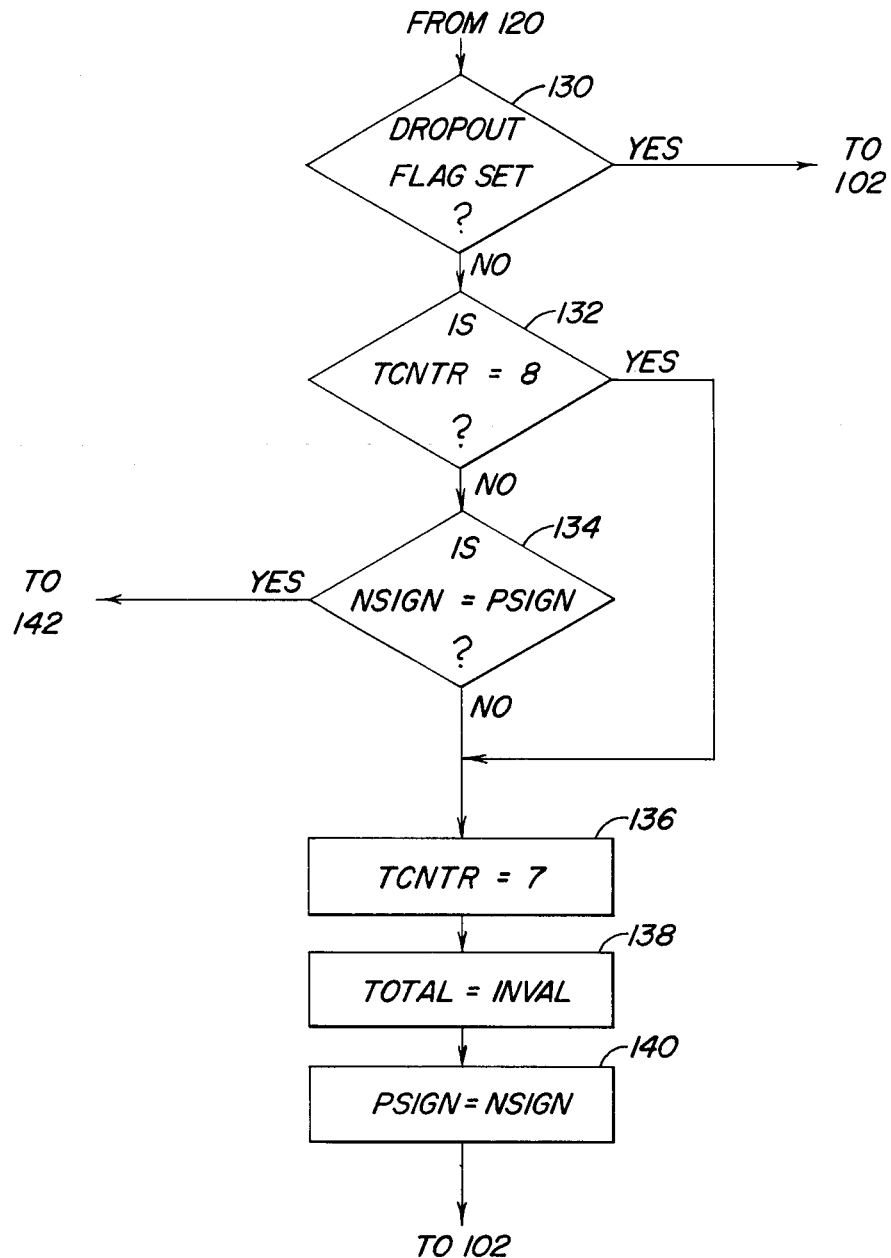
Figure 2D:
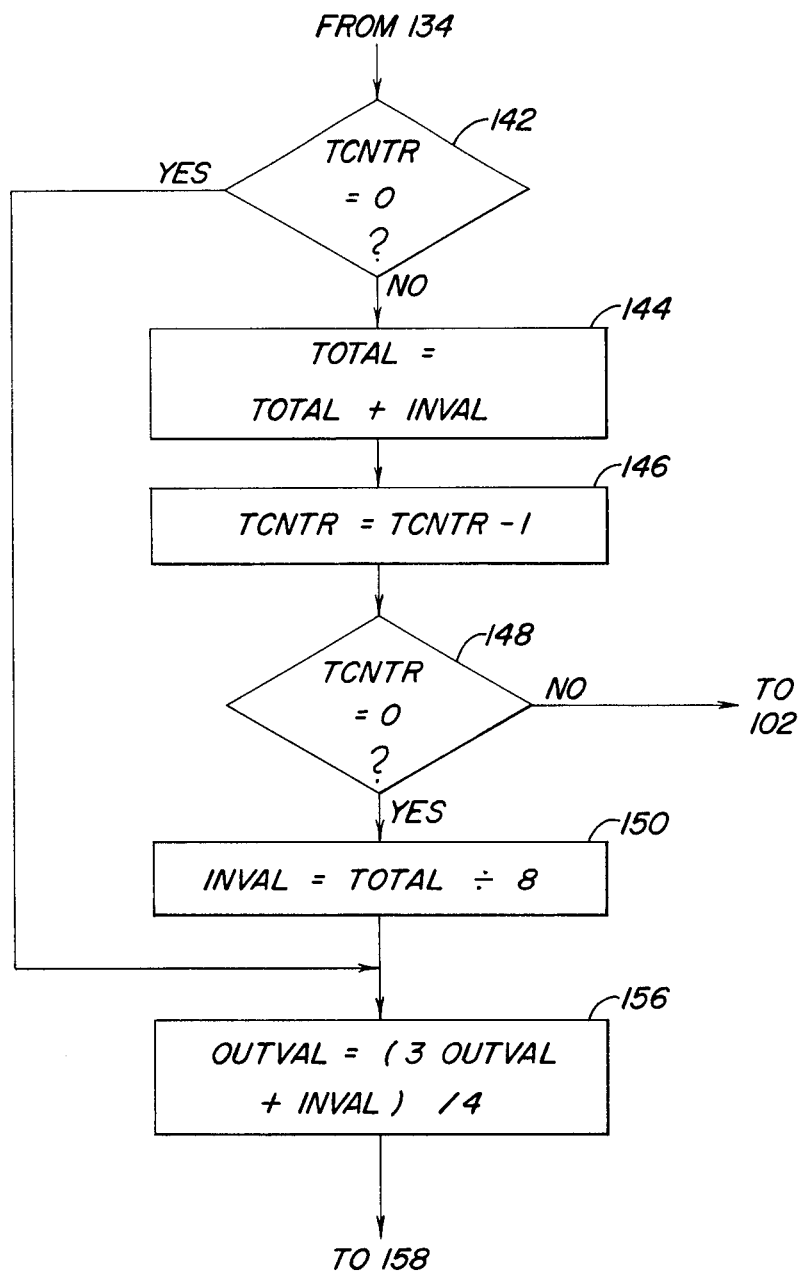

The ground speed radar system 10 includes a 24.125 GHz (K-Band) Gunn diode microwave transmitter 12 which provides excitation signals in a known manner to a focused beam, ellipsoidal reflector antenna 13. The Schottky mixer diode receiver 14 generates an output signal which has a Doppler (or difference) frequency containing the ground speed information of interest.

The receiver 14 drives a low noise, high gain bandpass amplifier 16. The 3 db passband of the amplifier 16 is preferably 3-pole Butterworth from 24 Hz to 1600 Hz. The midband voltage gain of the amplifier 16 is preferably 2100.

The output of amplifier 16 is routed to a Schmitt trigger 18 and to a peak detector 17. The peak detector 17 is coupled to the set input, S, of a D-type flip-flop 20. The Schmitt trigger 18 is coupled to the clock input, CLK, of the flip-flop 20.

The Schmitt trigger 18, the peak detector 17, and the flip flop 20 are used to provide an input signal to the microprocessor only when the signal from the receiver 14 to the band pass amplifier 16 is greater than 0.48 mV peak to peak at midband. The Schmitt trigger 18 is adjusted to switch at 2.0 V $\pm$0.25 V which is equivalent to a receiver output signal level of approximately 0.24 mVP-p at midband. The peak detector 17 is adjusted to enable the flip-flop 20 when a midland receiver output signal exceeds 0.48 mVp-p.

The signal from the flip-flop 20 is routed to the microprocessor 22, such as an Intel 8051. The microprocessor 22 produces a digital waveform 23 with a pulse width and frequency proportional to computed ground speed.

An enable circuit 24 includes an input filter (not shown) to protect the circuit from RFI (radio frequency interference) and a Schmitt trigger to filter low frequency noise. The enable circuit 24 receives a wheel speed level signal from a wheel speed sensor 25. Preferably, the enable circuit 24 and the wheel speed sensor 25 cooperate to disable the transmitter 12 and the microprocessor 22 whenever the vehicle wheel speed is less than a predetermined minimum wheel speed.

The microprocessor 22 generates an output pulse train by operation of an algorithm which will now be described with reference to FIGS. 2a–d, 3 and 4.

First, a system reset routine 100 is executed. In this system reset routine, conventional microprocessor programming tasks are performed. For example, a memory stack pointer is set to prevent undesirable data overwrites. Various registers and flags, as will be discussed later, are cleared, set or preset, as appropriate. For example, an output enable flag is cleared to disable the output pulse train, as will be explained later. Also, a 16 bit hardware input timer is initialized to zero and a 16 bit hardware output timer is initialized to one-half its maximum value. Then, both the input and output timers are started. The status of these timers will control the entering of input and output interrupt routines, as described later.

Figure 3:
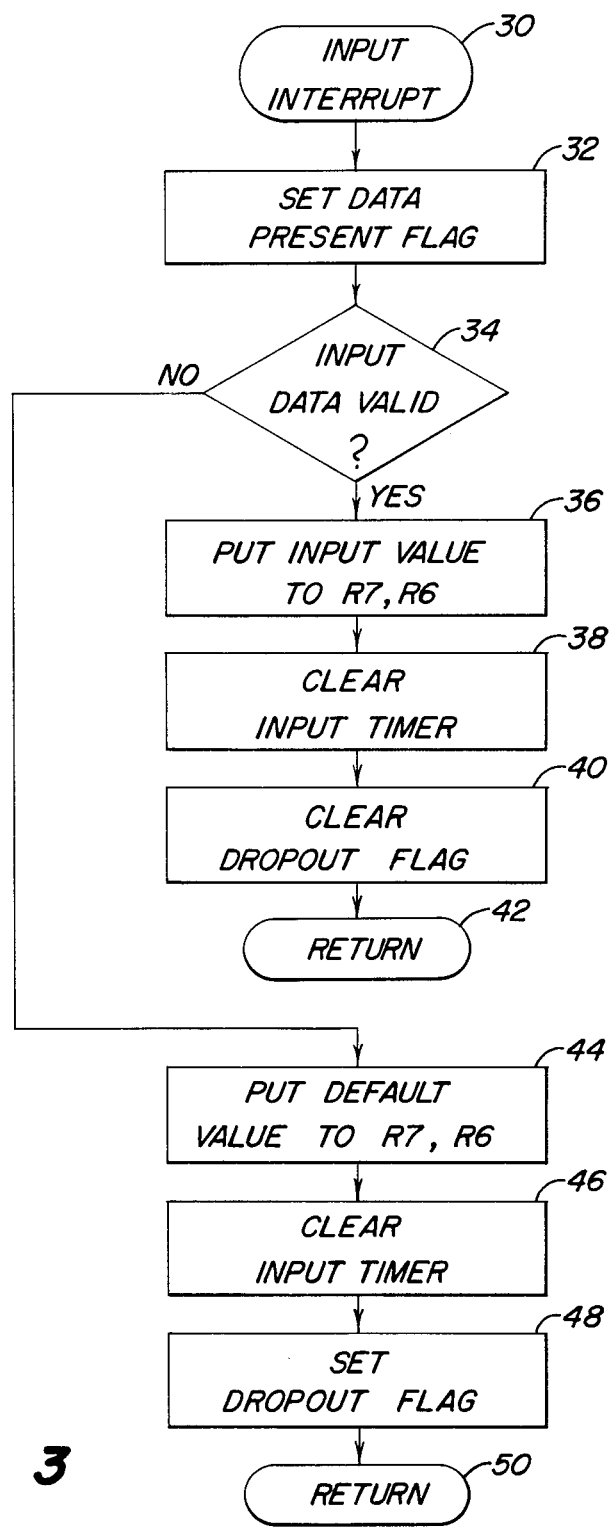
FIG. 3 is a logic flow diagram of an input interrupt routine executed in the present invention.
Figure 4:
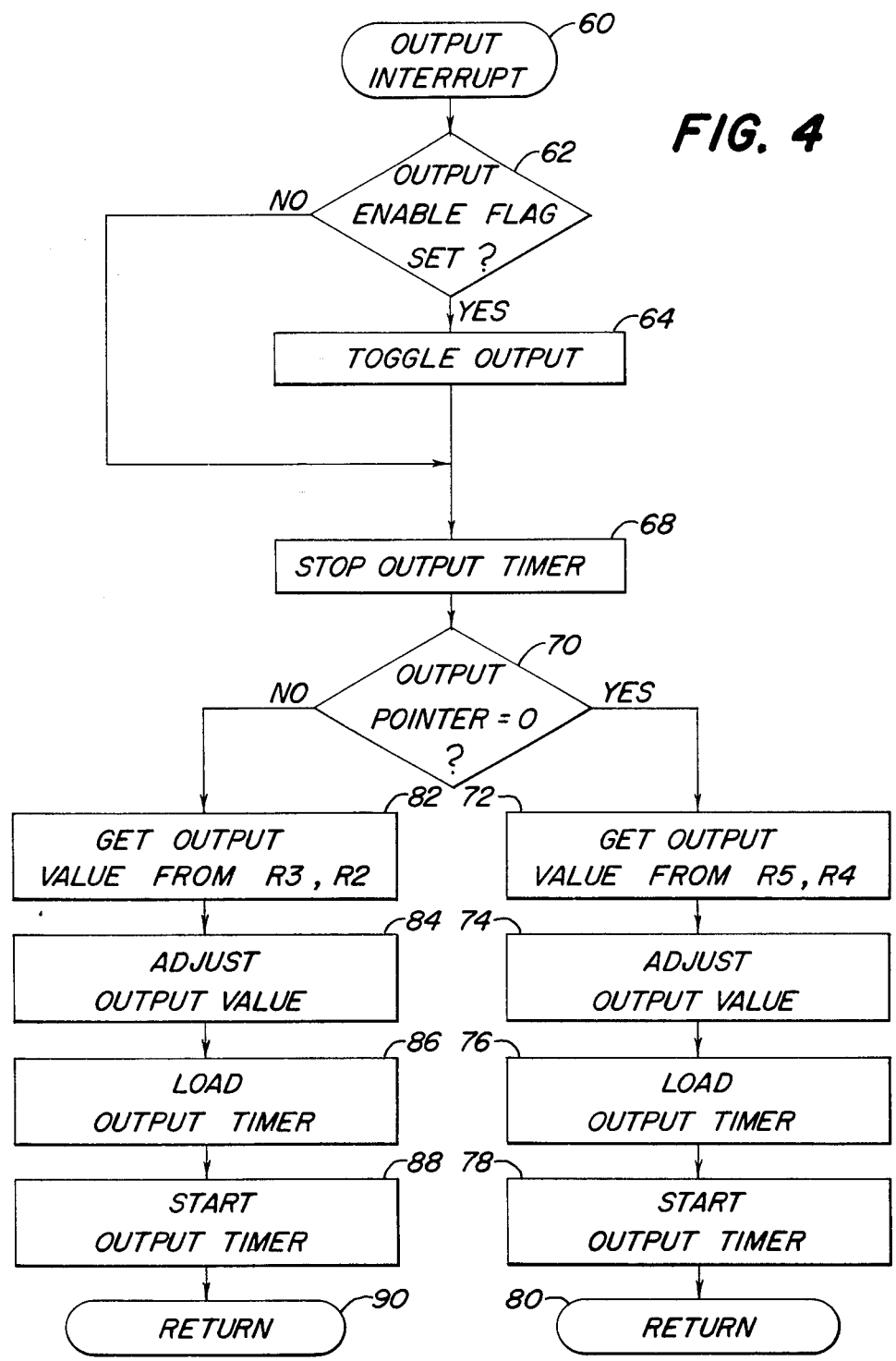
FIG. 4 is a logic flow diagram of an output interrupt routine executed in the present invention.

Next, the main signal processing algorithm starts at step 102. At this point, it is appropriate to describe the input interrupt and output interrupt routines, which are illustrated in FIGS. 3 and 4, respectively. The input interrupt routine is entered at step 30 in response to a high-to-low transition of the input signal to micro 22 from flip-flop 20, and a "data present" flag is set at step 32. Then, step 34 determines if the input data is valid or invalid. The input data is presumed to be invalid only if an input timer (cleared in steps 38 or 46) has overflowed. The input timer will overflow only when the input to micro 22 persists in the high state longer than 65,536 microseconds. If the input timer has not overflowed, the data is presumed valid and the routine is directed to step 36 which transfers the input value (representing the pulse width of the input signal) to input data registers R7, R6 (not shown). Then, the input data timer is cleared in step 38 and a "dropout" flag is cleared in step 40.

If, on the other hand, the input data was invalid, then step 34 directs the interrupt routine to step 44 which transfers a default value to input data registers R7, R6. Then, the input timer is cleared in step 46 and a "dropout" flag is set in step 48 to indicate the presence of invalid input data. Steps 42 and 50 cause the interrupt routine to return to the main algorithm following steps 40 and 48, respectively.

Turning now to FIG. 4, an output interrupt routine is entered at 60 whenever the output timer (a hardware timer first started during the system reset) times out. Then, step 62 determines whether the output enable flag has been set (as in steps 165 and 169 of the main algorithm). If not (as in step 105 of the main algorithm) the routine skips ahead to step 68. However, if yes, then the algorithm proceeds to step 64 which causes the output pulse train to toggle.

Then, in step 68, the output timer is stopped. Next, in step 70, the value of an output pointer (set in steps 164 or 168 of the main algorithm) is examined. The value of this pointer is restricted to 0 or 1. Use of this pointer causes the output interrupt routine to branch through steps 72-80 or steps 82-90 from step 70. Thus, two separate register pairs are used to prevent the output interrupt routine from fetching an output value which is in the process of being updated in the main signal processing routine. In step 72, the output value is obtained from output registers R5, R4, (not shown).

Following step 72, the output value is adjusted in step 74 by an amount which compensates for hardware delays. Then, this adjusted output value is loaded into the output timer in step 76. At this point, the output timer is started in step 78 and the routine returns to the main algorithm via step 80. Steps 82-90 are the same as steps 72-80, except that the output value is obtained from registers R3, R2 in step 82.

Now, returning to FIGS. 2a-d, the main algorithm starts at 102. Then, step 104 determines if the "data present" flag has been set (see step 32). If no, the algorithm proceeds to step 101 which updates the timer and then to 103 which determines if a software timer (which is set to expire after a time interval representing a travel speed of approximately 0.125 m.p.h) has expired. If this software timer has expired, the algorithm is directed to step 105 where the "output enable" flag is cleared so that step 62 prevents toggling of the output pin by step 64 of the output interrupt routine. In this manner, absence of input signals for a duration longer than a certain time causes the output signal to stop toggling. However, if the software timer has not expired, then step 103 returns the algorithm to step 102.

If, in step 104, the "data present" flag is set, then the algorithm proceeds to step 106 where the software timer (examined in 103) is reset. Then, in 107, the input pulse width value in registers R7, R6 (see step 36) is obtained and range limited to a value which corresponds to a velocity of less than 30 m.p.h. Then, this value is assigned to an "INVAL" memory location in step 108. Next, the input "data present" flag is cleared at step 110.

At step 112, an NSIGN value is set to represent a "+" if the new input data value, INVAL, is greater than the most recent output value, OUTVAL, from previous operation of steps 126 or 158. Similarly, in 114, the NSIGN value is set to represent a "−" if the INVAL is less than OUTVAL. In this manner, the NSIGN value represents whether the INVAL value has increased or decreased with respect to the most recent OUTVAL value.

Then, step 120 determines whether the INVAL value is within 12.5%, for example, of the OUTVAL value. If so, this means the input data is acceptable and the algorithm proceeds to step 122. If not, it means that the input data is not acceptable, and the routine proceeds from step 120 to 130. Thus, the algorithm responds to a predetermined consecutive number of a first kind of input pulses all having pulsewidths deviating by more than a predetermined amount from the predetermined output signal pulsewidth (OUTVAL) and generates an average input value (in step 150), and derives a first output value therefrom (in step 156) by execution of steps 120, 130-134 and 142-150.

If the INVAL value is acceptable at step 120, then an index value, TCNTR, is set equal to 8, for example, at step 122. Then, in step 126, the new output data value, OUTVAL is calculated as a weighted average of the previous OUTVAL value and the new INVAL value from 108. Thus, when INVAL represents a second kind of input pulses having a pulsewidth deviating by not more than a predetermined amount from a predetermined output signal pulsewidth (OUTVAL), the algorithm derives a second output value (OUTVAL) in step 126 by executing steps 120, 122 and 126.

Then, in 158, the OUTVAL value is adjusted to compensate for software delays, after which step 160 checks the value of the output buffer pointer. If the output pointer is equal to 1, the algorithm proceeds to steps 162-165 where the adjusted OUTVAL value is put in output registers R5, R4, the output pointer value is changed to zero (so that the other output registers will be used next time), and the output enable flag is set. Thus, when the output interrupt routine is re-entered, this new OUTVAL value will be loaded into the output timer so that the duration between togglings of the output pin corresponds to the value in the output registers.

If, in 160, the output pointer was zero, then the algorithm is directed to steps 166-169, which are the same as steps 162-165, except that in 166, the OUTVAL value is put in the other output registers, R3, R2 and the output pointer value is changed to 1. After 165 and 169, the algorithm returns to step 102 to await the next input signal.

Returning to step 120, if the INVAL value was outside the acceptable range, then step 130 determines if the "dropout" flag is set, as in step 48 of the input interrupt routine, due to an overflow of the input timer. If yes, the algorithm returns to 102. In this manner, input pulse widths with a duration longer than a certain time are completely ignored and thus, momentary Doppler signal loss (dropout) does not affect the accuracy of the output signal. If not, the algorithm proceeds to step 132 which checks the value of the index, TCNTR. If TCNTR equals 8, then this indicates that it is the first time through the algorithm with an invalid INVAL value, and the algorithm skips to step 136. In 136, the index TCNTR is set equal to 7. Then, in 138, a sum value, TOTAL, is set equal to the INVAL value and in 140, a sign storage value, PSIGN, is set equal to the NSIGN value, after which the algorithm returns to step 102.

Returning now to 132, if the TCNTR index is not equal to 8, it means that the TCNTR index must have previously been changed by step 136, which means that the previous INVAL value was also determined unacceptable by step 120. In this case, step 134 determines whether NSIGN equals PSIGN. If no, it means that the direction of change of the INVAL value with respect to the OUTVAL value has reversed and that there is not yet a consistent trend to the new INVAL values. In this case, step 134 directs the algorithm to previously described steps 136-140 and then back to 102.

On the other hand, if NSIGN=PSIGN in step 134, then it means the trend of consecutive difference between INVAL and OUTVAL is consistent and the algorithm is directed to step 142.

Step 142 determines whether the TCNTR index equals zero. If not, it means that 8 consecutive INVAL values with a consistent trend have not yet occurred, and the algorithm proceeds to step 144 where the TOTAL value is increased by the most recent INVAL value. Then, in 146, the TCNTR index is decremented. Then, 148 again compares the TCNTR index to zero and returns the algorithm to 102 to process a new input data signal if TCNTR does not equal zero. If TCNTR equals zero in 148, then it means that 8 consecutive input values with a consistent trend have been received and the INVAL value is redetermined in step 150 so that the INVAL value established in 150 is the average of the 8 most recent INVAL values showing the consistent trend. At this point, the algorithm proceeds to step 156, where the OUTVAL value is calculated as a weighted average of the previous OUTVAL value and the most recent INVAL value from step 150. After 156, the algorithm proceeds to previously described steps 158 and 160-165 or 158, 160 and 166-169 wherein the adjusted OUTVAL value is stored in the appropriate output registers. Thus, when an input pulsewidth value (represented by INVAL) is received which differs by more than 12.5% from the previous output pulsewidth value (represented by OUTVAL), the algorithm prevents recalculation of a new OUTVAL value until 8 consecutive input pulsewidth signals are received all showing the same trend and deviating from OUTVAL by at least 12.5%. Then, once the 8 consecutive input pulsewidth values are received, the new INVAL value is set equal to the average of those 8 input pulsewidth values and a new OUTVAL value is calculated.

Returning to step 142, if the TCNTR index equals zero, then it means that 8 consecutive INVALs have previously been processed and that a new INVAL, showing the same trend, has been received. In this case, the algorithm skips directly to step 156 where the OUTVAL value is redetermined without having another 8 INVAL values averaged together by repeated operation of step 150. This results in a signal processing response time which is faster than that of conventional phase locked loops once a consistent trend is established. As before, step 156 is followed by previously described steps 158 and 160-165 or 158, 160 and 166-169.

Thus, the OUTVAL value (derived from the main signal processing algorithm of FIGS. 2a-d) represents an output pulsewidth value and (via the output interrupt routine of FIG. 4), controls the toggling of the output of the micro 22 so that the output pulse train from micro 22 represents the ground speed of the vehicle (not shown) to which this speed sensing system may be coupled.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A radar speed sensing system for a vehicle moving over terrain, comprising:

means for generating high frequency electromagnetic energy and for providing a Doppler signal representative of a frequency difference between a return part of said high frequency energy and the generated energy;

directing and receiving means directing at least a portion of said generated energy along an axis intersecting with said terrain and receiving along said axis a returned part of said generated energy directed along said axis;

means for converting the Doppler signal to an input pulse train having input pulses with pulsewidths and frequency related to a ground speed of the vehicle; and signal processing means for receiving said input pulse train and for converting said input pulse train to an output pulse train having output pulses with pulsewidths and frequency related to vehicle ground speed, the signal processing means comprising:

(a) means for ignoring input pulses having a pulsewidth greater than a predetermined threshold pulsewidth;

(b) means responsive to a predetermined consecutive number of a first kind of said input pulses, all having a pulsewidth deviating by more than a predetermined amount from a predetermined output signal pulsewidth, for generating an average input value representing an average of the pulsewidths of said predetermined number of the first kind of said input pulses;

(c) means for deriving a first output value from the average input value and a stored output signal pulsewidth value;

(d) means responsive to a second kind of said input pulses, having a pulsewidth deviating by not more than said predetermined amount from said predetermined output signal pulsewidth, for deriving a second output value from a pulsewidth value of said second kind of said input pulses and from a stored output signal pulsewidth value; and (e) means for generating the output signal pulse train as a function of the first and second output values, the output pulse train having output pulses with pulsewidths and frequency related to the first and second output values and to the vehicle ground speed.

2. The invention of claim 1, wherein the first output value is a weighted average of the stored output signal pulsewidth value and the average input value.

3. The invention of claim 1, wherein the second output value is a weighted average of the stored output signal pulsewidth value and the pulsewidth value of the second kind of said input pulses.

4. The invention of claim 1, further comprising:
means for generating a data present flag in response to a predetermined transition of the input pulse train;
timer means for generating a time signal upon expiration of a predetermined time period;
means for clearing a data dropout flag when a data present flag is generated before generation of the time signal and for setting a data dropout flag when a data present flag is generated after generation of the time signal; and
means for preventing derivation of output values from the first kind of said input pulses when the dropout flag is set.

5. The invention of claim 1, further comprising:
an output timer;
means for loading the output timer with the derived output values;
means for starting the output timer running after it is loaded with the derived output values; and
means for producing a transition of the output pulse train in response to expiration of the output timer.

6. The invention of claim 1, further comprising:
means for generating a data present flag in response to a predetermined transition of the input pulse train;
timer means for generating a time signal upon expiration of a predetermined time period;
means for clearing a data dropout flag when a data present flag is generated before generation of the time signal and for setting a dropout flag when a data present flag is generated after generation of the time signal;
means for preventing derivation of output values from the first kind of said input pulses when the dropout flag is set;
an output timer;
means for loading the output timer with the derived output values;
means for starting the output timer running after it is loaded with the derived output values; and
means for producing a transition of the output pulse train in response to expiration of the output timer.

7. The invention of claim 3, wherein the stored output value is weighted more heavily than the pulsewidth value of the second kind of said input pulses.

8. The invention of claim 2, wherein the stored output value is weighted more heavily than the average input value.

9. The invention of claim 6, further comprising:
means for preventing a transition of the output pulse train unless a pedetermined transition of the input pulse train occurs within a pedetermined time period.

10. The invention of claim 6, further comprising:
enable means for producing a transition of the output pulse train when the output timer expires due to the presence of at least one predetermined transition of the input pulse train before expiration of a predetermined time period.

11. The invention of claim 9, further comprising:
means for setting the output signal to a predetermined state when transitions of the output signal are prevented.

* * * * *